United States Statutory Invention Registration [19]

[11] Reg. Number: H881

Holt [43] Published: Jan. 1, 1991

[54] TV SEEKER ELECTRONIC COLOR FILTER

[75] Inventor: Harold H. Holt, Huntsville, Ala.

[73] Assignee: The United States of America as represented by the Secretary of the Army, Washington, D.C.

[21] Appl. No.: 551,105

[22] Filed: Jul. 9, 1990

[51] Int. Cl.[5] ..... H04N 7/18; F41G 7/00

[52] U.S. Cl. ..... 358/100; 358/103; 358/108; 358/109; 244/3.11

*Primary Examiner*—Linda J. Wallace

*Attorney, Agent, or Firm*—Freddie M. Bush; James T. Deaton

[57] ABSTRACT

A TV seeker electronic color filter that has a three color striped solid state video sensor chip mounted in the optical path of a TV camera of a missile with the color filter stripes being manually selected by an individual to provide an optical response in portions of the spectrum to enable a target to be enhanced by the selection of the appropriate filter by an individual operator.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TV SEEKER ELECTRONIC COLOR FILTER

DEDICATORY CLAUSE

The invention described herein may be manufactured, used, and licensed by or for the Government for governmental purposes without the payment to me of any royalties thereon.

BACKGROUND OF THE INVENTION

In the past, it has not always been possible to seek a particular target by utilizing a TV camera and visualizing a target on a TV monitor from a cluttered background. In this particular area, there is a need for a device or method in which the target can be made to stand out and viewed more vividly on a TV monitor from the background clutter around the target.

Accordingly, it is an object of this invention to provide a method by which a target can be more vividly displayed on a TV monitor by selecting the appropriate filter or filters for making the target most visible.

Another object of this invention is to provide a method that utilizes a solid state filter in which a red, green, blue, or a combination of two or more of these colors can be selected to cause the target to be enhanced when viewed on a TV monitor.

Other objects and advantages of this invention will be obvious to those skilled in this art.

SUMMARY OF THE INVENTION

In accordance with this invention, a method of enhancing the image of a target is provided by utilizing a conventional CCD Color Striped TV image sensor chip in a TV seeker camera and selecting the most appropriate color or colors of the color striped TV image sensor chip that produces the most vivid image of the object desired to be detected and displaying this image on a TV monitor in a conventional manner.

DESCRIPTION OF THE PREFERRED EMBODIMENT

Figure 1:
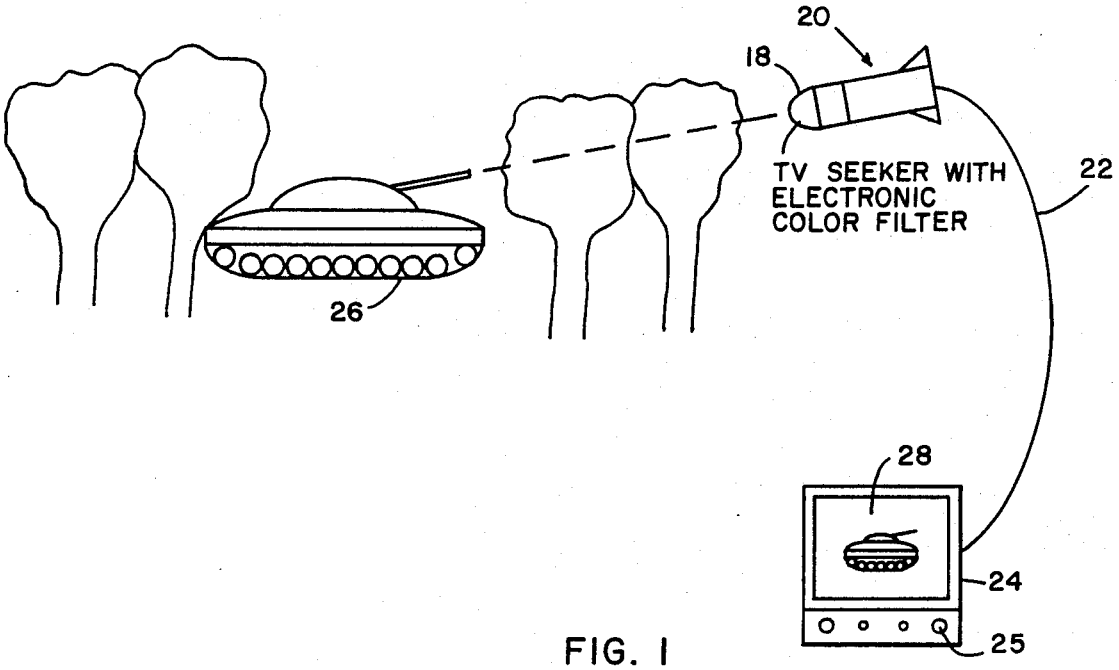
FIG. 1 is a schematic illustration of a TV seeker camera electronic color filter system for detecting a target in a cluttered background.
Figure 2:
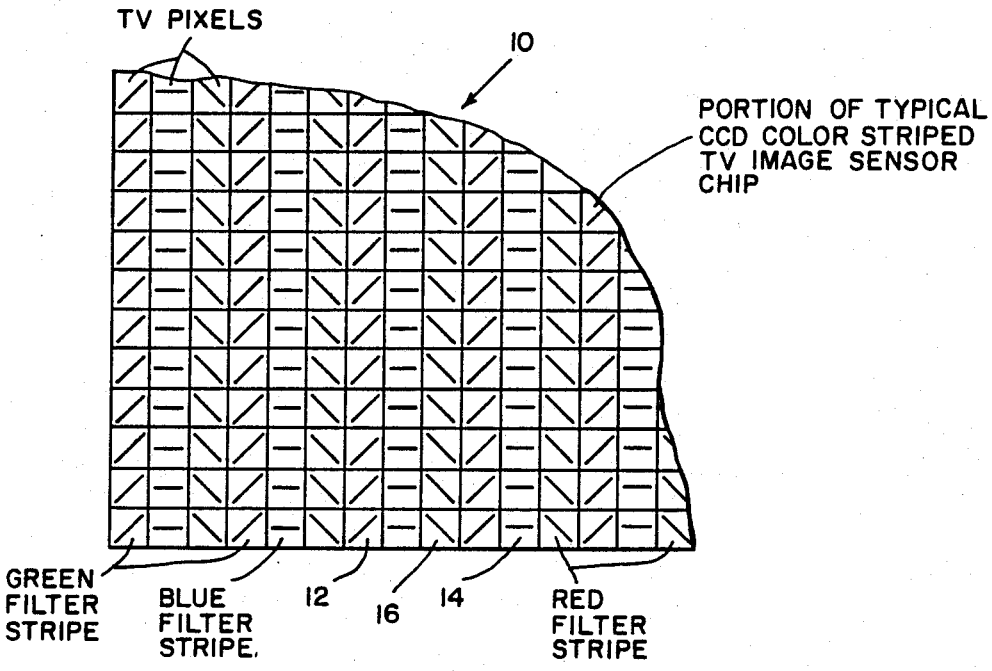
FIG. 2 is a view partially cut away and schematically illustrating a TV solid state image sensor chip that has red, green and blue filter stripes.

Referring now to the drawing, this invention provides a method of enhancing targets for a TV Seeker/-Tracker/System that enables the operator to discriminate targets from clutter. The invention uses a three color stripe filter type sensor chip 10 that has stripes 12, 14 and 16. The stripes when activated by the operator in a conventional manner, cause stripe 12 to produce a green filter, stripe 14 to produce a blue filter, stripe 16 to produce a red filter or a combination filter can be produced by turning on two or more of filters 12, 14, and 16. Chip 10 is utilized in a conventional manner in TV seeker camera 18 to filter the image thereof and is mounted in missile 20 with missile 20 being connected by data link 22 to monitor 24. An operator adjusts control 25 of monitor 24 to select the appropriate filter stripe or stripes of chip 10 in a conventional manner through link 22 to produce the most vivid image of a target such as tank 26 on screen 28 of monitor 24. When the most vivid image is produced in the particular clutter background in which the target is couched, this sets the system and the TV Seeker camera is then utilized to track target 26 for missile 20 to be directed to target 26 in a conventional manner. As will be appreciated, the operator can adjust control 25 to optimize the specific response of chip sensor 10 to enhance target visibility of a target such as 26 and increase the probably of detection and hit. The electronically selectable filter chip 10 makes the system in which the chip is utilized very versatile. The three color stripes of solid state video sensor chip 10 that is utilized in TV camera 18 of the missile system enables the selection of predetermined filter stripes to individually select and provide optical response in portions of the selected spectrum. This selectable filtering by the operator in a manual way makes targets more visible depending upon the background clutter and lighting condition in which the target is couched. By being able to choose from the multiplicity of filters, the operator can select the filter or combination of filters that enhances the target the most. As will be appreciated, the operator can with this system optimize the spectral response of the sensor to enhance target visibly and increase the probably of detection and hit of the target.

I claim:

1. A method of enhancing a target viewed through a TV Seeker camera electronic color filter system comprising, utilizing a multi color image filter chip in an optical path of a TV seeker camera, selecting the appropriate color of the image filter chip which produces the most vivid picture of a target in a cluttered background by manually selecting the appropriate filter of the image filter chip, and displaying the image from the TV seeker camera on a monitor.

2. A method as set forth in claim 1, wherein said image filter chip has three color strips and the selected filter is from one to a combination of three of said color stripes.

3. A system for enhancing a target viewed through a TV seeker camera system comprising, a TV seeker camera mounted in a missile for viewing a target, said TV seeker camera being connected at its output to a TV seeker monitor, said TV camera having a color stripe TV image sensor chip mounted in the optical path thereof, manual operation means mounted on the monitor and connected to said chip for selecting from one, two, or three color stripes of said chip to enable an operator to select the most vivid target from a cluttered background depending upon the clutter background and lighting of the target.

* * * * *